United States Patent [19]
Jagadish et al.

[11] Patent Number: 5,987,108
[45] Date of Patent: *Nov. 16, 1999

[54] TELEPHONE BILLING WITH CUSTOMER-DEFINED BUDGETING

[75] Inventors: Hosagrahar V. Jagadish; Inderpal S. Mumick, both of Berkeley Heights, N.J.

[73] Assignee: AT&T Corp, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,547

[22] Filed: Mar. 19, 1997

[51] Int. Cl.⁶ .................................................. H04M 15/00
[52] U.S. Cl. ......................... 379/114; 379/111; 379/121; 379/131
[58] Field of Search .................................... 379/114, 144, 379/145, 121, 131, 133, 112, 124, 126, 130, 140

[56] References Cited

U.S. PATENT DOCUMENTS

| | | | |
|---|---|---|---|
| 4,979,207 | 12/1990 | Baum et al. | 379/112 |
| 5,146,491 | 9/1992 | Silver et al. | 379/114 |
| 5,222,125 | 6/1993 | Creswell et al. | 379/67 |
| 5,265,155 | 11/1993 | Castro | 379/114 |
| 5,291,543 | 3/1994 | Freese et al. | 379/406 |
| 5,381,467 | 1/1995 | Rosinski et al. | 379/121 |
| 5,384,831 | 1/1995 | Creswell et al. | 379/67 |
| 5,450,477 | 9/1995 | Amarant et al. | 379/93 |
| 5,506,893 | 4/1996 | Buscher et al. | 379/114 |
| 5,517,555 | 5/1996 | Amadon et al. | 379/112 |
| 5,544,229 | 8/1996 | Creswell et al. | 379/67 |
| 5,553,131 | 9/1996 | Minervino, Jr. et al. | 379/221 |
| 5,557,664 | 9/1996 | Burns et al. | 379/114 |
| 5,568,541 | 10/1996 | Greene | 379/114 |
| 5,577,101 | 11/1996 | Böhm | 379/119 |
| 5,579,379 | 11/1996 | D'Amico et al. | 379/112 |
| 5,581,607 | 12/1996 | Richardson, Jr. et al. | 379/88 |
| 5,586,175 | 12/1996 | Hogan et al. | 379/112 |
| 5,592,537 | 1/1997 | Moen | 379/67 |
| 5,748,718 | 5/1998 | Manicone | 379/131 |
| 5,793,852 | 8/1998 | Kang et al. | 379/115 |
| 5,802,145 | 9/1998 | Farris et al. | 379/34 |

FOREIGN PATENT DOCUMENTS

0705019 A2  4/1996  European Pat. Off. ....... H04M 15/00

*Primary Examiner*—Paul Loomis
*Assistant Examiner*—Binh K. Tieu

[57] ABSTRACT

A method and system of telephone call processing that provides direct control of telephone usage based on customer established budgets. According to one aspect of the present invention, customer specific information including pricing data and budget parameters for a customer are stored, as is summary information relating to customer telephone usage. A call setup query is received from a network switch. A call setup response is generated based on the budget parameters and the summary information and the call setup response is transmitted to the network switch. In order to generate the stored summary information, a plurality of records are received wherein each record describes a telephone call. A priced call value for each call is determined using the record and the customer specific information. Summary information for the customer is determined using the record, the priced call values and the budget parameters. The summary information is then stored. According to another aspect of the present invention, a network switch receives a telephone call from a caller and transmits a call setup query identifying the caller to a billing analysis system. The network switch receives a call setup response indicating whether summary information of the caller exceeds at least one budgetary limit of the caller and determines whether to complete the call based on the call setup response.

26 Claims, 5 Drawing Sheets

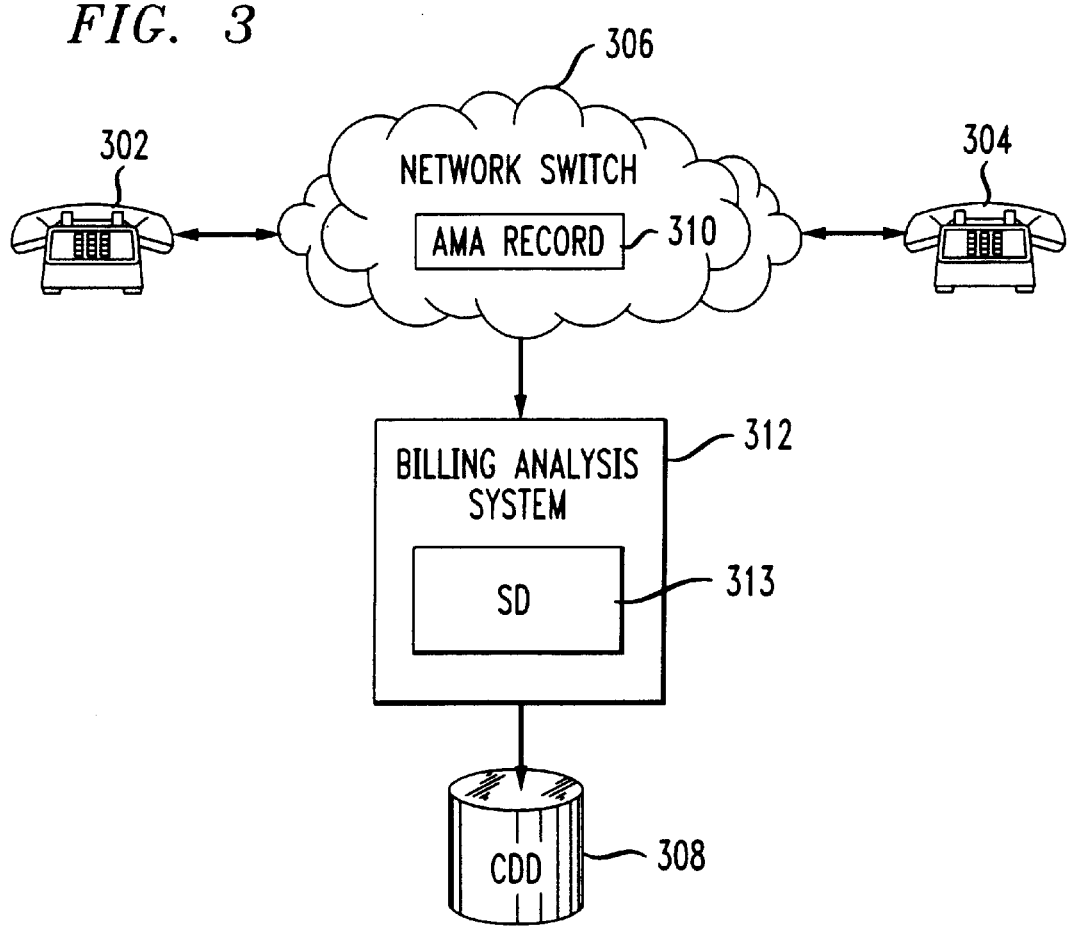
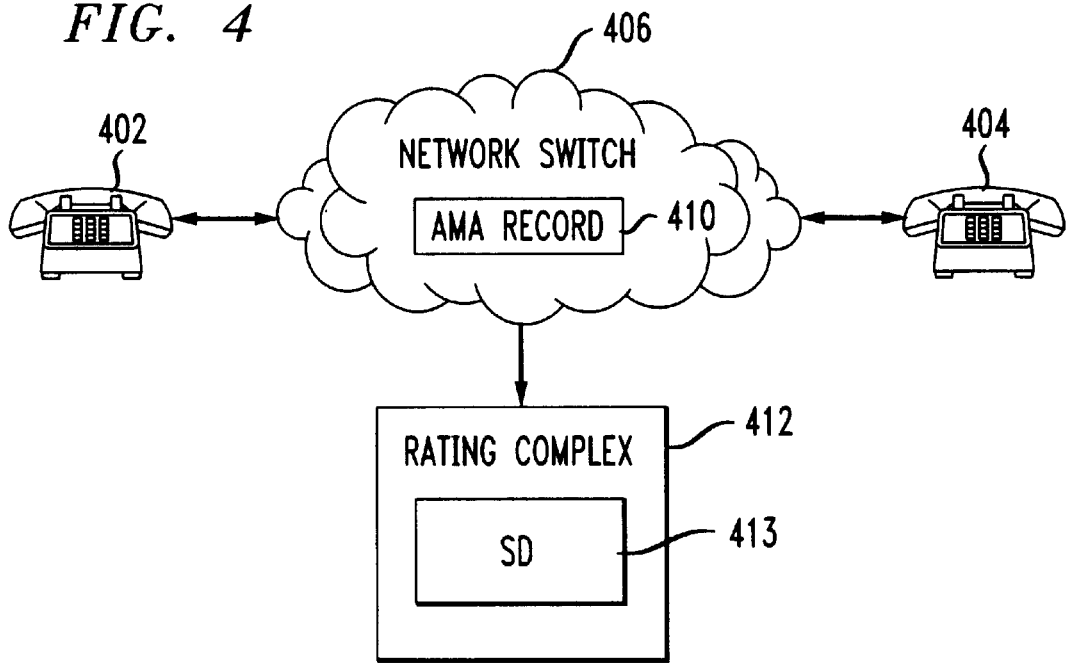

TELEPHONE BILLING WITH CUSTOMER-DEFINED BUDGETING

FIELD OF THE INVENTION

The present invention relates to the processing of telephone calls, and in particular, to the billing of the costs of such calls.

BACKGROUND OF THE INVENTION

Many telephone service customers desire to control the cost of their telephone usage. Telephone bills provide information about recent past usage, but do not provide customers with control over current usage. It would be useful if telephone service customers could directly control their telephone usage by establishing budgets.

SUMMARY OF THE INVENTION

The present invention is a method and system of telephone call processing that provides direct control of telephone usage based on customer established budgets.

According to one aspect of the present invention, customer specific information including pricing data and budget parameters for a customer are stored, as is summary information relating to customer telephone usage. A call setup query is received from a network switch. A call setup response is generated based on the budget parameters and the summary information and the call setup response is transmitted to the network switch.

In order to generate the stored summary information, a plurality of records are received wherein each record describes a telephone call. A priced call value for each call is determined using the record and the customer specific information. Summary information for the customer is determined using the record, the priced call values and the budget parameters. The summary information is then stored.

According to another aspect of the present invention, a network switch receives a telephone call from a caller and transmits a call setup query identifying the caller to a billing analysis system. The network switch receives a call setup response indicating whether summary information of the caller exceeds at least one budgetary limit of the caller and determines whether to complete the call based on the call setup response.

BRIEF DESCRIPTION OF THE DRAWINGS

The details of the present invention, both as to its structure and operation, can best be understood by referring to the accompanying drawings, in which like reference numbers and designations refer to like elements.

FIG. 3 is a block diagram of another embodiment a telephone call billing system, in which the present invention may be implemented.

FIG. 4 is a block diagram of another embodiment a telephone call billing system, in which the present invention may be implemented.

DETAILED DESCRIPTION OF THE INVENTION

Figure 1A:
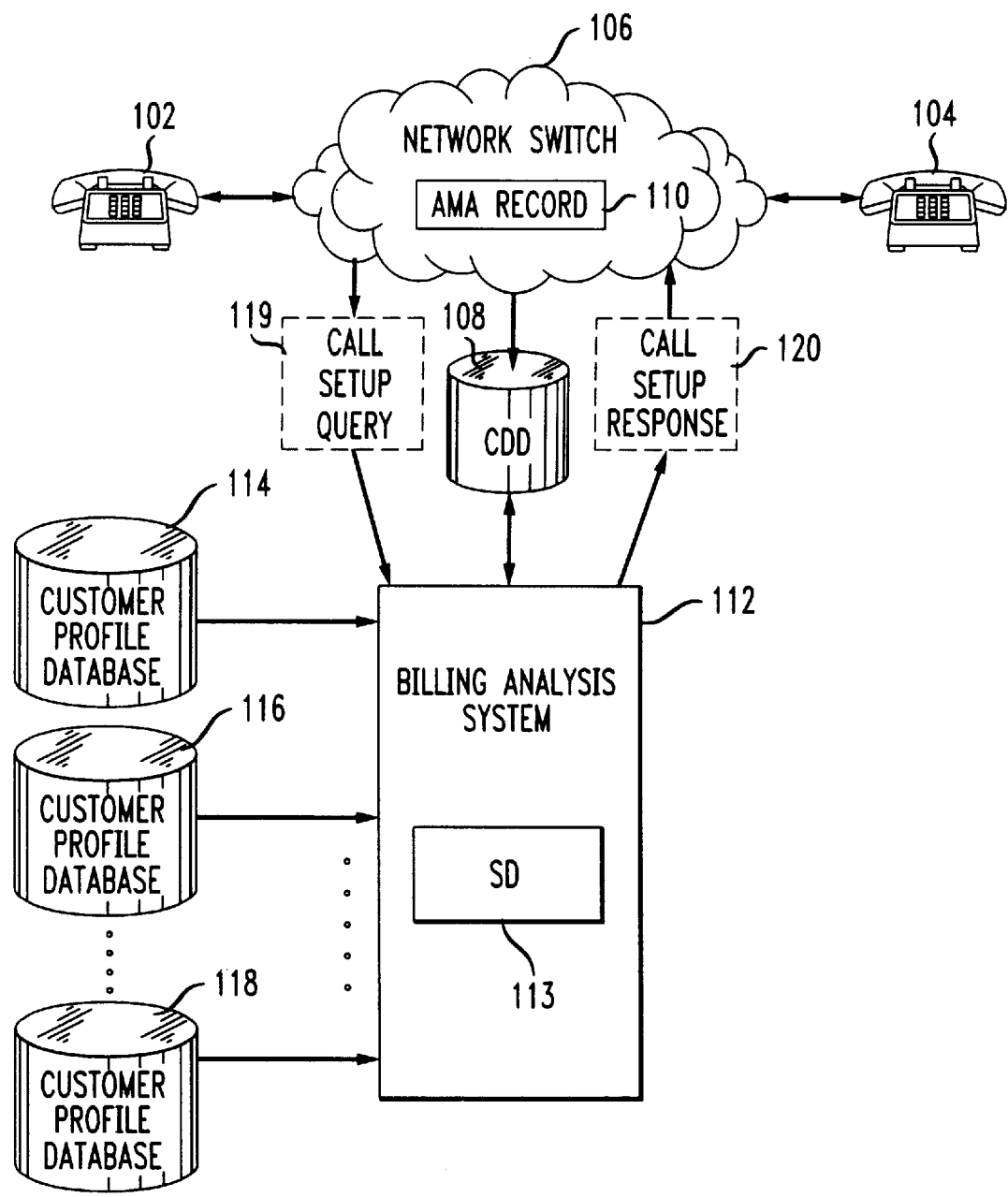
FIG. 1*a* is a block diagram of one embodiment a telephone call billing system, in which the present invention may be implemented.

Referring to FIG. 1*a* there is shown a block diagram of a telephone system in accordance with one embodiment of the present invention. There is shown a calling telephone 102, a called telephone 104, a telephone network switch 106 and a Call Detail Database (CDD) 108. An Automatic Message Accounting (AMA) record, represented by a block 110, is also shown. As indicated by the figure, a billable call may be initiated at telephone 102 and routed through switch 106, e.g., an AT&T 4ESS switch, to telephone 104. The switch generates AMA record 110, which includes the information necessary to rate the call. The AMA record is passed to CDD 108. It should be noted here that there are an abundance of protocols and transmission media that may be used for passing the data from the switch to the CDD. For example, suitable protocols include the well known File Transfer Protocol (FTP) and Transmission Control Protocol/Internet Protocol; and suitable transmission media include twisted shielded pair wires, fiber optic lines, coaxial cable, and wireless links. Moreover, these protocols and media are suitable for use in all data transfers and queries hereinafter described.

In any event, once the AMA record has been passed to the CDD, it is available for use in pricing the call. To this end, the AMA record is passed to a billing analysis system 112, which may be a general purpose computer capable of running the software necessary to implement the invention. The billing analysis system applies any customer specific billing parameters to the AMA record to produce a processed AMA record. It then passes both the AMA record and the processed AMA record back to the CDD for storage. A method for passing the data back to the CDD is disclosed in co-pending, commonly assigned, U.S. patent application Ser. No.: 08/607,983—entitled "Compression and Buffering of a Stream with Data Extraction Requirements"—which application is incorporated herein by reference.

The billing analysis system performs its functions the instant the switch passes the AMA record to the CDD (i.e. it performs call pricing in real-time). In order to achieve real-time processing of AMA records the invention must overcome two primary obstacles. First, the customer specific data is fragmented across multiple business units, with no cohesive notion of an integrated customer profile. This situation is depicted in FIG. 1*a*, which shows several customer profile databases 114, 116 and 118. As shown in the figure, the invention overcomes this obstacle through the use of an integrated customer profile database located within the billing analysis system. Software tools update the integrated customer profile database in response to updates of the individual customer profiles 114, 116 and 118 so that the integrated database always contains current information on all customers.

The volume of customer and telephone call data makes it difficult to store, rate, and query call data in real-time. To surmount this obstacle the invention accumulates summary information as each individual call (AMA) record is received and rated in real-time. It is generally desirable for a telephone network to maintain a customer's current bill. Thus, one type of accumulated summary information may be current bills for each network customer. Nevertheless, it may be useful to accumulate other types of summary information for particular customers. The nature of the accumulated summary information for a particular customer depends upon the services subscribed to by that customer.

For example, a customer may subscribe to a plan in which calls made during the hours between 5:00 pm and 9:00 am receive a 10% discount; in which case it is useful to maintain a summary field containing the number of minutes of calls that the customer has made during the discount period.

In any case, the summary information is stored in a Summary Database (SD) 113 that is located within the billing analysis system. Thus, in this embodiment, AMA records and processed AMA records are stored in the CDD, while summary information is stored in the SD. Once summary information has been stored in SD 113, it is available for immediate access. It should be noted that many alternative storage schemes may be employed without departing from the spirit of the invention. For example, in one alternative scheme, AMA records are stored in the CDD, summary information are stored in the SD, and processed AMA records are stored in both the CDD and SD.

One use for real-time access to summary information involves call setup query 119. When a call is initiated, for example, by telephone station 102, and routed to network switch 106, before the call is connected to the destination station, for example, station 104, switch 106 may transmit a call setup query 119 to billing analysis system 112. The call setup query includes information identifying the customer that placed the call. Typically the Automatic Number Identification (ANI) is used for this purpose. In an ANI system, the number of the telephone station from which a call is initiated is determined and used to identify the party who initiated the call. The call setup query also includes information identifying the destination of the call and may include other information. In response to receiving query 119, billing analysis system 112 may access summary information stored in SD 113 and generate a call setup response 120 based on the summary information.

Figure 1B:
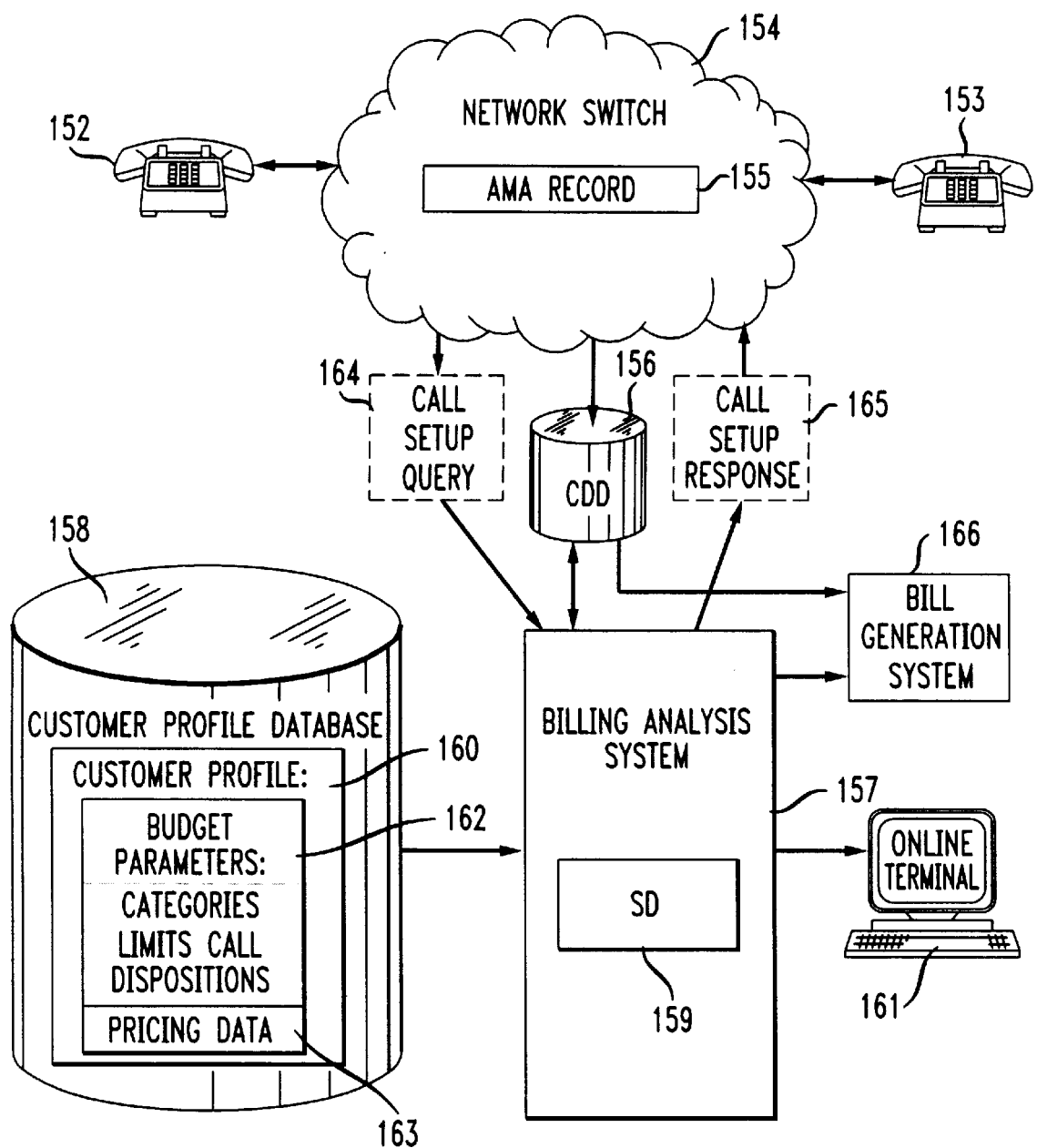
FIG. 1*b* is a block diagram of the telephone call billing system of FIG. 1*a*, showing a customer profile including summary parameters according to the present invention.

The processing involved in customer-defined budgeting is shown in FIG. 1b, which, as an example, shows the present invention implemented in the telephone billing system of FIG. 1a. The present invention may be similarly implemented in the telephone billing systems shown in FIGS. 3 and 4.

The processing involved in customer-defined budgeting includes two phases: the call setup phase and the call completion phase. The call completion phase begins once a billable call has occurred. Typically, a billable call occurs once a call has been completed from a calling station to a destination station, for example from calling station 152 to destination station 153. Once a billable call occurs, network switch 154 generates a corresponding AMA record 155. The AMA record includes an indication of the customer that placed the call. Typically the Automatic Number Identification (ANI) is used for this purpose. Each AMA record is passed to CDD 156, making the record available for call pricing. Each AMA record is passed from CDD 156 to billing analysis system 157, which applies the customer specific billing parameters contained in the attached customer profile database, such as database 158. The billing analysis system 157 then generates updates to summary information stored in the summary database (SD) 159 based on the customer profile 160 stored in customer profile database 158. The updates to the summary information are generated in real-time as calls are placed and AMA records generated. Updated summary information is available for access immediately after a summary information update is entered into SD 159. Thus, updated summary information may be accessed whenever desired. For example, a bill may be generated in real-time upon demand of a customer. Summary information stored in SD 159 may also be made available to customers without generating a bill. Snapshot summaries, of the current status of the customer's account, may be generated. In addition, online access to summary information may be provided, such as by online terminal 161.

Customer profile 160 includes budget parameters 162 that define the summary information that is to be generated and the budget information that is to be applied to the summary information for the customer. Customer profile 160 also includes pricing data 163 that is used to price each telephone call. Customers may subscribe to billing services which provide semi-custom budgeting, or fully custom budget information may be provided. The budget parameters may be defined directly by the customer, or the budget parameters may be defined based on a budgetary arrangement requested by the customer.

Typically, budget parameters 162 specify categories for which information is compiled and for which budgetary limits are defined. Budget parameters 162 may specify that summary information be compiled based on a budgetary category and also specify a maximum cost for that category. For example, the budgetary category may be defined as the total cost of calls made each day and the maximum cost is applied to the cost of those calls. In this example, the summary information update generated for each call would include an update to the total cost of calls made that day. Likewise, budgetary categories may be defined, and the corresponding summary information may be compiled, based on the total cost of calls made to each of a given set of numbers, area codes, cities, states, countries, etc., on the time or cost of calls in one or more discount plans, or based on the type of calls made, such as collect calls, etc. Budget parameters 162 may also specify call dispositions to be performed when corresponding budget limits are exceeded.

The call setup phase occurs once a call from calling station has been routed to network switch 154, before the call is completed to the destination station. For example, a customer places calls from calling station 152 to destination station 153. The call is routed to a network switch 154, which generates a call setup query 164, beginning the call setup phase. Switch 154 transmits query 164 to billing analysis system 157. The call setup query includes information identifying the customer that placed the call and information identifying the destination of the call and may include other information.

Upon receiving query 164, billing analysis system 157 accesses customer profile database 158 and obtains the customer specific information contained in customer profile 160. In particular, billing analysis system 157 applies pricing data 163 and budget parameters 162 to the information in query 164. Since the call has not been completed, a priced call value cannot be determined. However, pricing data 163 and budget parameters 162 are used to determine a budgetary category for the call, based on the budget defined for the customer. Billing analysis system 157 accesses summary database 159 and obtains the customer's summary information for the corresponding budgetary category. Billing analysis system 157 applies the budgetary limit for the budgetary category that is defined by budget parameters 162 to the summary information and determines the disposition of the call. The call disposition may be defined along with the budgetary limits, or the billing analysis system may apply default call dispositions. Billing analysis system 157 generates a call setup response 165 indicating the disposition of the call and transmits response 165 to network switch 154. Upon receiving response 165, network switch 154 handles the call according to the call disposition in response 165.

For example, a customer may define a budgetary category of the total cost of calls per day, with a limit on the category of $20.00. The customer may specify a call disposition for that limit such that no calls are to be allowed once the limit is exceeded. The customer may also specify a limit on the category of $15.00, with a call disposition such that a warning message is played to the caller before each call is connected, once the limit is exceeded. Each call that is placed causes billing analysis system 157 to access the summary information for the budgetary category and compare the summary information to the defined limits. In this example, the summary information includes the total cost of calls each day. When a new call is placed, the current total cost is compared to the defined limits. If the current total cost is less than $15.00, the call setup response includes a call disposition indicating that the call is to be completed normally. If the current total cost is between $15.00 and $20.00, the call setup response includes a call disposition indicating that a warning message is to be played, then the call is to be completed normally. If the current total cost is greater than $20.00, the call setup response includes a call disposition indicating that the call is not to be completed. The call setup response may also include information used to generate informative messages to be played to the call, such as the budgetary categories, limits and current total cost.

More complex budget limit definitions, and corresponding call dispositions, are possible. For example, three, four, or more budget limits may be defined, with different messages to be played when each limit is exceeded. Budget limits may be simultaneously active in a plurality of categories, such as total call usage, calls to particular locations, calls made at particular times of day, calls made which fall into particular billing plans, etc. All budget limits may be simultaneously active and each call may be cause comparisons to be made against all active budget limits.

Complex budget definitions may result in complex call dispositions being performed. Dispositions other than rejecting the call and playing a warning message may be defined. For example, calls may be forwarded, routed to voice mail or otherwise rerouted. In addition, calls may be delayed and automatically connected at a later time, such as when lower rates are in effect, etc. The call dispositions may be defined along with the budget limits and categories, or default call dispositions may be applied.

Bills are generated by bill generation system 166 based on the summary information stored in SD 159, which depends on the budget parameters 162 in the customer profile. Bills may be generated periodically, on a predetermined schedule, whenever the generated summary information reaches a predetermined threshold, or bills may be generated whenever desired. If desired, budgetary information may be added to a bill by using the budget parameters 162.

Figure 2A:
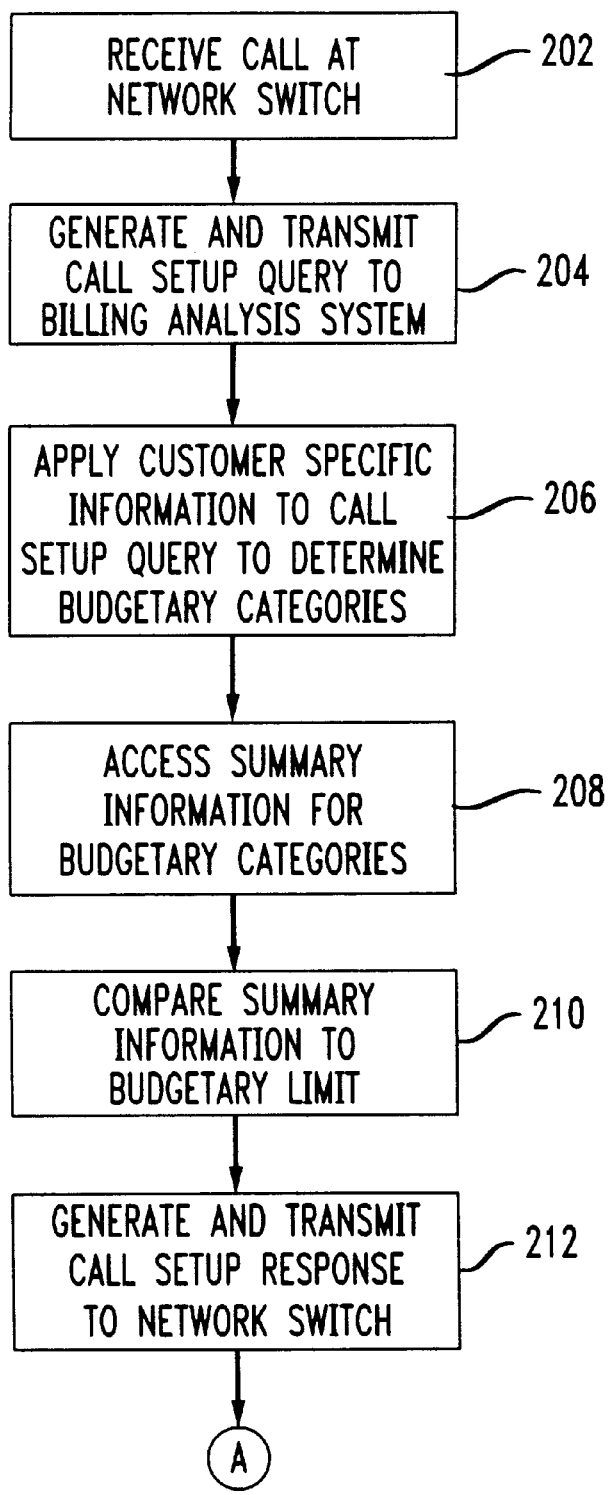
FIGS. 2*a* and 2*b* are a flow diagram of the operation of a summary billing process according to the present invention.
Figure 2B:
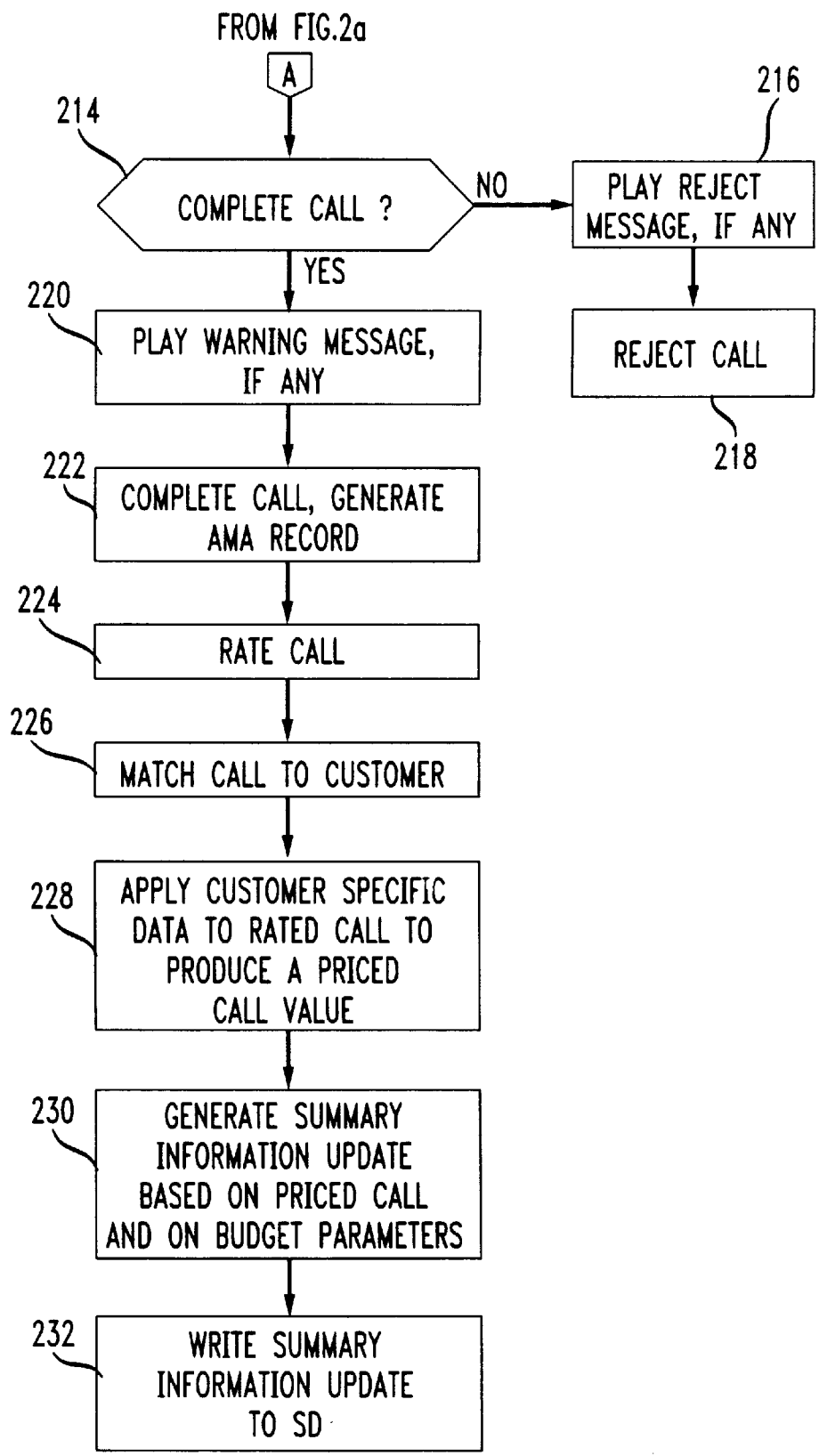

FIGS. 2a and 2b show, in flowchart form, a procedure that a billing analysis system may use to perform customer-defined budget processing for each call. The call setup phase is shown in FIG. 2a and the call completion phase is shown in FIG. 2b. In the following description of the flowchart, references will be made to the embodiment shown in FIG. 1b.

Referring to FIG. 2a, the process begins with step 202, in which a call is received at a network switch 154. In step 204, network switch 154 generates and transmits a call setup query 164 to a billing analysis system 157. The call setup query 164 includes information identifying the customer that placed the call and information identifying the destination of the call and may include other information. In step 206, billing analysis system 157 applies the customer specific information, including the budget parameters 162 and the pricing data 163, to the information in the call setup query and determines the budgetary categories affected by the call. In step 208, billing analysis system 157 accesses the summary database 159 and obtains the summary information for the affected budgetary categories. In step 210, billing analysis system 157 compares the obtained summary information to the defined budgetary limits. In step 212, billing analysis system 157 generates a call setup response 165 based on the defined budgetary limits and the defined call dispositions. Billing analysis system 157 then transmits the call setup response 165 to the network switch 154.

Turning now to FIG. 2b, the process continues with step 214, in which the network switch 154 receives the call setup response 165 and determines from the call disposition included in the response whether the call should be completed. If response 165 indicates that the call should not be completed, then in step 216, the network switch plays a reject message, if any is indicated by the call disposition included in the response. For example, a reject message might inform the caller that the call will not be completed because usage in a particular budgetary category has been exceeded. The category and any other information needed for the message is included in the call setup response. In step 218, network switch 154 then rejects the call.

If the call disposition included in call setup response 165 indicates that the call should be completed, then in step 220, network switch 154 plays a warning message, if any is indicated by the call disposition included in response 165. For example, a warning message might inform the caller that usage is approaching the limit in a particular budgetary category. Again, the category and any other information needed for the message is included in the call setup response. In step 222, network switch 154 completes the call to the destination station, generates an AMA record 155 and transmits AMA record 155 to the CDD 156. The AMA record is then passed from CDD 156 to billing analysis system 157. In step 220, upon receiving an AMA record, such as 155 from CDD 156, billing analysis system 157 rates the call. In step 224, billing analysis system 157 matches the rated call to the customer, so that customer specific parameters can be applied to the call.

Several well known techniques can be used to match the rated call to the customer. One such technique uses Automatic Number Identification (ANI). In an ANI system, the number of the telephone station from which a call is initiated is determined and used to identify the party who initiated the call. Accordingly, in the FIG. 1b embodiment, the number of a telephone, such as 152 may be determined and passed to the billing analysis system along with the AMA record. The billing analysis system may then cross-reference the number to the customer profile containing the customer specific data to be used for the current call. For example, AMA record 155 is cross-referenced to customer profile 160, which also relates to that customer. Customer profile 160 contains customer specific pricing data 163 that is used to price the call, as well as budget parameters 162 that define the budgetary categories for which summary information is to be generated. Once the appropriate profile, or profiles, if there are multiple customer profile databases, have been determined, then in step 228, the billing analysis system applies the pricing data contained in the profiles to the rated call to produce a priced call value. In step 230, the billing analysis system generates summary information updates defined by the budgetary parameters based on the priced call value. In step 232, the priced call value (processed AMA record) is stored in the CDD and the summary information update for the customer is stored in the SD. Once the summary information update is stored, the updated summary information is available for use in call setup processing, as shown in FIG. 2a.

As described in relation to FIG. 1a an alternative scheme is to store both the priced call value and current bill— collectively termed "the priced call data"—in the SD; in which case, step 212 would involve storing the priced call value and the current bill in the SD.

Referring now to FIG. 3, there is shown an alternative embodiment of a telephone system in accordance with the present invention. The customer profiles are not shown, but are similar to those shown in FIG. 1b. As shown in the figure, a call may be initiated at a first telephone 302 and directed to a second telephone 304. The call is routed by a network switch 306, which generates an AMA record 310 for the call. The AMA record is passed to a billing analysis system 312 which applies customer specific pricing data to the AMA record to produce a processed AMA record. The AMA record and processed AMA record are then passed to a CDD 308 for storage.

Like the billing analysis system of FIG. 1b, the billing analysis system of FIG. 3 includes a SD 313. The billing analysis system of FIG. 3 also includes an integrated customer profile—although, it should be noted that for simplicity of presentation the individual customer profile databases and the bill generation system are not shown in FIG. 3, nor in the figures that follow. Also, like the billing analysis system of FIG. 1a the billing analysis system of FIG. 3 accumulates summary information as each individual call record is received and rated in real-time, the summary information being stored in the SD 313. As in the prior described embodiment, alternative schemes may be employed for the storage of the AMA records, processed AMA records, and summary information.

FIG. 4 shows another embodiment of a telephone system in accordance with the present invention. The customer profiles are not shown, but are similar to those shown in FIG. 1b. In the FIG. 4 embodiment, as in the previous embodiments, a call initiated at a first telephone 402 may be directed to a second telephone 404 through a network switch 406, which generates an AMA record 410. However, in the FIG. 4 embodiment the AMA record is passed to a Rating Complex (RC) 412. The RC is a unit which performs the functions of the CDD and billing analysis system, and may therefore be characterized as a combined CDD and billing analysis system. As shown in the figure, the RC may include a SD 413 for storing the summary information separately from the AMA records and processed AMA records. As in the prior described embodiments, alternative schemes may be employed for the storage of the AMA records, processed AMA records, and summary information.

It should be noted that although all three embodiments discussed above depict a call as being initiated from a first telephone and directed to a second telephone, it is possible that calls may be initiated by, and directed to, many different types of communication devices. For example, a call may be initiated by a fax machine and directed to a personal computer. Moreover, a call may be initiated by a single communication device and directed to multiple communication devices. For example, a call may be initiated by a fax machine and directed to multiple independent personal computers. For purposes of this description, each instance of a single initiating call being directed to a different terminating device will be considered an independent call.

Although specific embodiments of the present invention have been described, it will be understood by those of skill in the art that there are other embodiments which are equivalent to the described embodiments. Accordingly, it is to be understood that the invention is not to be limited by the specific illustrated embodiments, but only by the scope of the appended claims.

What is claimed is:

1. A method of telephone call processing comprising the steps of:

storing customer specific information including pricing data and budget parameters for a customer, the budget parameters specifying a plurality of budgetary categories, a plurality of budgetary limits for each specified budgetary category, a call disposition corresponding to each budgetary limit, and corresponding summary information that is to be generated;

generating summary information relating to telephone usage of the customer as specified by the budget parameters;

storing the generated summary information;

receiving a call setup query from a network switch;

determining a budgetary category based on the call setup query and the customer specific information;

accessing summary information for the budgetary category;

comparing the accessed summary information to each budgetary limit; and generating a call setup response indicating whether the summary information exceeds any budgetary limit, the call setup response including a call disposition corresponding to a budgetary limit that has been exceeded;

transmitting the call setup response to the network switch;

completing the call, if the call setup response indicates that no budgetary limit of the caller is exceeded;

playing a first message to the caller and completing the call, if the call setup response indicates that a first budgetary limit of the caller is exceeded; and playing a second message to the caller and rejecting the call, if the call setup response indicates that a second budgetary limit of the caller is exceeded.

2. The method of claim 1, wherein each call disposition is defined by the customer.

3. The method of claim 2, wherein the budget parameters are defined by the customer.

4. The method of claim 2, wherein the budget parameters are defined based on a request from the customer.

5. The method of claim 2, wherein the performing step comprises the steps of:

completing the call, if the call setup response indicates that no budgetary limit of the caller is exceeded; and rejecting the call, if the call setup response indicates that at least one budgetary limit of the caller is exceeded.

6. The method of claim 5, further comprising the step of:

playing a message to the caller, if the call is rejected.

7. The method of claim 2, wherein the performing step comprises the steps of:

completing the call, if the call setup response indicates that no budgetary limit of the caller is exceeded;

playing a first message to the caller and completing the call, if the call setup response indicates that a first budgetary limit of the caller is exceeded; and playing a second message to the caller and rejecting the call, if the call setup response indicates that a second budgetary limit of the caller is exceeded.

8. The method of claim 1, wherein the budgetary categories specified by the budget parameters specify at least one budgetary category selected from the following:

(a) a total cost of calls made each day;

(b) a total cost of calls made to a selected set of telephone numbers;

(c) a total cost of calls made to a selected set of area codes;

(d) a total cost of calls made to a selected set of cities;

(e) a total cost of calls made to a selected set of states;

(f) a total cost of calls made to a selected set of countries; and (h) a total cost of collect calls made at a selected time of day.

9. A system for telephone call processing comprising:

a first database storing customer specific information including pricing data and budget parameters for a customer, the budget parameters specifying a plurality of budgetary categories, a plurality of budgetary limits for each specified budgetary category, a call disposition corresponding to each budgetary limit, and corresponding summary information that is to be generated;

a second database, coupled to the first database, storing summary information generated as specified by the budget parameters; and a billing analysis system, coupled to the first database and the second database, comprising:

a receiver receiving a call setup query from a network switch, a response generator generating a call setup response based on the budget parameters and the summary information by performing the steps of:

determining a budgetary category based on the call setup query and the customer specific information;

accessing summary information for the budgetary category;

comparing the accessed summary information to each budgetary limit; and generating a call setup response indicating whether the summary information exceeds any budgetary limit, the call setup response including a call disposition corresponding to a budgetary limit that has been exceeded;

a transmitter transmitting the call setup response to the network switch; and a call completion device performing the call disposition indicated by the call setup response.

10. The system of claim 9, wherein each call disposition is defined by the customer.

11. The system of claim 10, wherein the budget parameters are defined by the customer.

12. The system of claim 10, wherein the budget parameters are defined based on a request from the customer.

13. The system of claim 10, wherein the call completion device performs the call disposition by:

completing the call, if the call setup response indicates that no budgetary limit of the caller is exceeded; and rejecting the call, if the call setup response indicates that at least one budgetary limit of the caller is exceeded.

14. The system of claim 13, wherein the call completion device performs the call disposition by further:

playing a message to the caller, if the call is rejected.

15. The system of claim 10, wherein the call completion device performs the call disposition by:

completing the call, if the call setup response indicates that no budgetary limit of the caller is exceeded;

playing a first message to the caller and completing the call, if the call setup response indicates that a first budgetary limit of the caller is exceeded; and playing a second message to the caller and rejecting the call, if the call setup response indicates that a second budgetary limit of the caller is exceeded.

16. The system of claim 10, wherein the call setup response indicates a call disposition and the call completion device performs the call disposition indicated by the call setup response.

17. The system of claim 9, wherein the budgetary categories specified by the budget parameters specify at least one budgetary category selected from the following:

(a) a total cost of calls made each day;

(b) a total cost of calls made to a selected set of telephone numbers;

(c) a total cost of calls made to a selected set of area codes;

(d) a total cost of calls made to a selected set of cities;

(e) a total cost of calls made to a selected set of states;

(f) a total cost of calls made to a selected set of countries; and (h) a total cost of collect calls made at a selected time of day.

18. A system for telephone call processing comprising:

means for storing customer specific information including pricing data and budget parameters for a customer, the budget parameters specifying a plurality of budgetary categories, a plurality of budgetary limits for each specified budgetary category, a call disposition corresponding to each budgetary limit, and corresponding summary information that is to be generated;

means for generating summary information relating to telephone usage of the customer as specified by the budget parameters;

means for storing summary information;

means for receiving a call setup query from a network switch;

means for generating a call setup response based on the budget parameters and the summary information; comprising means for determining a budgetary category based on the call setup query and the customer specific information, means for accessing summary information for each budgetary category, means for comparing the accessed summary information to the budgetary limit, and means for generating a call setup response indicating whether the summary information exceeds any budgetary limit, the call setup response including a call disposition corresponding to a budgetary limit that has been exceeded;

means for transmitting the call setup response to the network switch; and means for performing the call disposition indicated by the call setup response.

19. The system of claim 18, wherein the call disposition is defined by the customer.

20. The system of claim 19, wherein the budget parameters are defined by the customer.

21. The system of claim 19, wherein the budget parameters are defined based on a request from the customer.

22. The system of claim 19, wherein the means for performing a call disposition comprises:

means for completing the call, if the call setup response indicates that no budgetary limit of the caller is exceeded; and means for rejecting the call, if the call setup response indicates that at least one budgetary limit of the caller is exceeded.

23. The system of claim 22, wherein the means for performing a call disposition further comprises:

means for playing a message to the caller, if the call is rejected.

24. The system of claim 19, wherein the means for performing a call disposition comprises:
   means for completing the call, if the call setup response indicates that no budgetary limit of the caller is exceeded;
   means for playing a first message to the caller and completing the call, if the call setup response indicates that a first budgetary limit of the caller is exceeded; and
   means for playing a second message to the caller and rejecting the call, if the call setup response indicates that a second budgetary limit of the caller is exceeded.

25. The system of claim 19, wherein the call setup response indicates a call disposition and the means for performing a call disposition performs the call disposition indicated by the call setup response.

26. The system of claim 18, wherein the budgetary categories specified by the budget parameters specify at least one budgetary category selected from the following:
   (a) a total cost of calls made each day;
   (b) a total cost of calls made to a selected set of telephone numbers;
   (c) a total cost of calls made to a selected set of area codes;
   (d) a total cost of calls made to a selected set of cities;
   (e) a total cost of calls made to a selected set of states;
   (f) a total cost of calls made to a selected set of countries; and
   (h) a total cost of collect calls made at a selected time of day.

* * * * *